US005290082A

United States Patent [19]

Palmer et al.

[11] Patent Number: 5,290,082

[45] Date of Patent: Mar. 1, 1994

[54] BATTERY OPERATED HAND HELD VACUUM HANDLING DEVICE

[76] Inventors: Harold D. Palmer, 970 Pulpit Rock Cir. North, Colorado Springs, Colo. 80918; Daren D. Palmer, 8630 Candleflower Cir.; Thomas P. Mealey, 8160 Engleton Ct., both of Colorado Springs, Colo. 80920

[21] Appl. No.: 908,373

[22] Filed: Jul. 6, 1992

[51] Int. Cl.[5] .............................................. B25J 15/06

[52] U.S. Cl. ...................................... 294/64.1; 29/743

[58] Field of Search ....................... 294/1.2, 64.1-64.3; 15/329, 339, 344, 419, 421, DIG. 1; 29/743; 116/202; 269/21; 271/90

[56] References Cited

U.S. PATENT DOCUMENTS

| | | | |
|---|---|---|---|
| 3,294,434 | 12/1966 | Sinn | 294/64.1 |
| 3,879,076 | 4/1975 | Barnett | 294/64.1 X |
| 4,071,272 | 1/1978 | Drdlik | 294/64.1 X |
| 4,079,976 | 3/1978 | Rainin et al. | 294/64.1 X |
| 4,123,098 | 10/1978 | Shoup | 294/64.1 X |
| 4,265,476 | 5/1981 | Elgart | 294/64.1 |
| 4,332,408 | 6/1982 | Cointment | 294/1.2 |
| 4,397,491 | 8/1983 | Anderson | 294/64.1 |
| 4,527,824 | 7/1985 | Rosenfeld | 294/64.1 |
| 4,618,178 | 10/1986 | Hutson et al. | 294/64.1 |
| 4,767,142 | 8/1988 | Takahashi et al. | 294/64.1 |
| 4,822,278 | 4/1989 | Oliva et al. | 294/64.1 X |
| 4,901,606 | 2/1990 | Christensen | 294/64.1 X |
| 5,106,139 | 4/1992 | Palmer et al. | 294/64.1 |
| 5,118,153 | 6/1992 | Allison et al. | 294/64.1 |

FOREIGN PATENT DOCUMENTS

| | | | |
|---|---|---|---|
| 273598 | 11/1989 | Fed. Rep. of Germany | 294/64.1 |

*Primary Examiner*—Johnny D. Cherry

[57] ABSTRACT

A hand held tool for grasping and moving light weight objects includes a battery powered vacuum. Upon pressing an actuator, an electrical circuit is completed, activating the vacuum pump. The vacuum pump draws air from a valving system, causing air to be drawn through a nozzle. A variety of gripping devices may be attached to the nozzle, so that air is also drawn through the attached gripping device when the vacuum pump is activated. As a result, the gripping device may be placed in proximity to a light weight object, so that activation of the vacuum pump results in that object being held against the gripping device, for ease of movement, until the vacuum pump is deactivated.

7 Claims, 4 Drawing Sheets

BATTERY OPERATED HAND HELD VACUUM HANDLING DEVICE

1.0 BACKGROUND OF THE INVENTION

1.1 TECHNICAL FIELD

This invention relates to grasping and moving light weight objects. In many industries, processes, and hobbies there is a need to grasp and manipulate small objects that are difficult to grasp with a human hand. Grasping an object may be difficult due to the objects size, its shape, its orientation, its location relative to other objects or in space restricted areas. Some objects are fragile and may be damaged if gripped by the human hand or other mechanical grasping means. Other handling situations are sensitive to contamination by skin oils if touched or grasped by the human hand. Still other handling circumstances involve objects that are at an elevated temperature too hot to handle from a personal safety standpoint. In these predicaments it would be advantageous to have a hand held tool that would not impart mechanical damage or contamination to the object being manipulated and would protect the person using the tool from unsafe conditions.

One area in which such a hand held tool would prove to be useful is the semiconductor production industry where wafers used in the production of integrated circuits are handled. The device may be used to pick-up and move wafers from one processing location to another. Contamination of a wafer during the clean room processing operations could result in defective chip locations in the finished semiconductor wafer. After the wafers are diced and sealed into integrated circuit packages, the hand held tool could be used to grasp the integrated circuits to place them in test fixtures or shipping containers. Some of the tests are performed in elevated temperature processing ovens therefore, the components may be hot during handling. Similarly, the same device may be used in the placement of electronic components onto circuit boards during the assembly operations in the electronics industry. Additionally, small components used in various hobbies or other industries involving installation of small parts may be easily grasped and positioned using such a hand-held vacuum-handling tool.

1.2 BACKGROUND ART

Devices which attempt to accomplish the task of grasping and manipulating small objects are known in prior art. Such devices have limitations that have been solved by the device described in this specification. Limitations include devices that are tethered with vacuum hoses or electrical cords. Such cords and tubes encumber the devices and restrict freedom of movement from one location to another to accomplish handling operations. One such tool is described in U.S. Pat. No. 4,822,278 to Oliva. This instrument is connected to an external vacuum source by way of a vacuum hose. Such a tool encumbered by a vacuum hose restricts freedom of movement from one location to another. This tool can only be used in a confined area during the handling operations. Additionally, the probe is mounted in such a fashion that the entire tool must be maneuvered to accomplish various handling orientations of the curved probe. The tool described in this specification solves this problem with a nozzle that is rotatably attached with an internal friction washer that provides resistance to unwanted rotation as well as the ability to rotate the probe to any orientation.

Other portable suction handling devices are known in the prior art. Thus, U.S. Pat. Nos. 4,123,098 to Shoup, 3,879,076 to Barnett, 4,017,272 to Drdlik, 5,106,139 to Palmer, 4,079,976 to Raninin and 4,332,408 to Cointment all describe portable hand held vacuum handling devices. These devices, although hand held and very portable, lack a means to replenish the suction that is lost to air leaks between the gripping member and the object that is being handled. Air leaks are caused by irregularities in the object being handled, porosity of the surface of the object being handled, dust or other particles at the interface between the gripping member and the object being handled, and irregularities on the surface of the gripping member due to variations in the gripping member manufacturing process. As a result, the objects being handled with these devices can drop from the handling tool after a short period of time. The tool in this specification solves this problem by inclusion of an electrically-controlled vacuum pump that continuously compensates for suction loss to air leaks. Another dilemma associated with these tools surrounds their dependence upon a resilient bladder to create the suction. Suction created by this means falls in the range of 2 to 5 inches of mercury. This low level of vacuum does not have sufficient force to lift and hold objects in excess of 150 grams. The tool described in this specification solves this problem by providing vacuum in the range of 10 to 14 inches of mercury which is sufficient to reliably handle up to 250 grams of load.

Of those tools known in prior art for moving small light weight objects, each of them have obstacles associated with their design that precludes their use for many applications. Devices encumbered with hoses or cords restrict movement. In others, the lack of a means to provide sufficient vacuum or to replenish loss of vacuum due to air leaks severely restricts the size of the object that can be handled and the time period for which the objects can be handled. A hand-held device is needed that provides freedom of movement over a large area, maintains vacuum for an extended period of time, and furnishes sufficient vacuum to lift a wide variety of object sizes.

2. DISCLOSURE OF THE INVENTION

2.1 Summary of the Invention

An object of this tool is to provide a process for moving small, elevated-temperature objects from one location to another.

Another object of this tool is to provide a process for moving small, ambient-temperature objects from one location to another.

Another object of this tool is to provide a hand held electrically operated tool to pick-up and move small objects.

Another object of this invention is to provide a vacuum activated pick-up tool which is electrically operated and is not encumbered by external vacuum lines or electrical cords.

Another object of this invention is to provide a continuous generation of vacuum to compensate for air leaks caused by porosity of the object being handled, or irregularities on the surface of the object being picked-up and/or manipulated.

It is yet another object of this invention to provide a means of attaching various implements to the pick-up end of this tool to allow easy manipulation of different sizes and shapes of objects being handled.

It is yet another object of this invention to provide a means of attaching various implements to the pick-up end of this tool in a fashion that allows easy orientation of the implement end for ease of use by the person engaged in its use.

It is still a further object of this tool is to provide a vacuum pick-up tool that uses a minimum amount of energy so that it can be used for extended periods of time without restoring the energy source.

It is still a further object of this tool to provide a continuous vacuum handling tool that is Electro Static Discharge safe.

It is a further object of this tool is to provide a means by which the object being handled can by quickly released.

The tool utilized in this method of picking-up and moving objects must have be of a size that will be easily gripped by a person's hand and having an easy method of operation so as to not cause fatigue of the hand.

An elongated rectangular tube is used to house an energy source, a motor, a vacuum pump, a means to control the operation of the tool and a means to removably attach various gripping implements to the front of the tool. The means to removably attach gripping elements is attached in a manner that allows it to be rotated so that the implement end opposite the interlocking connection can be positioned in a plane preferred by the user of the tool.

Ideally, to facilitate assembly of the device, the actuating member extends into the rectangular tube through a hole in an escutcheon member that slides into the front of the rectangular tube.

The means to control operation of the tool includes an internal valve to regulate flow of energy to the motor and an internal valve to manage the air pressure within the vacuum passageways. A unique cap at the rear of the tool provides easy access for replenishment of the energy source.

The novel features that are considered characteristic of the invention are set forth in the claims. Other objects and a full understanding of the invention will become clear from the accompanying description and drawings.

2.2 BRIEF DESCRIPTION OF THE DRAWINGS

2.3 DETAILED DESCRIPTION OF THE PREFERRED EMBODIMENT

Figure 1:
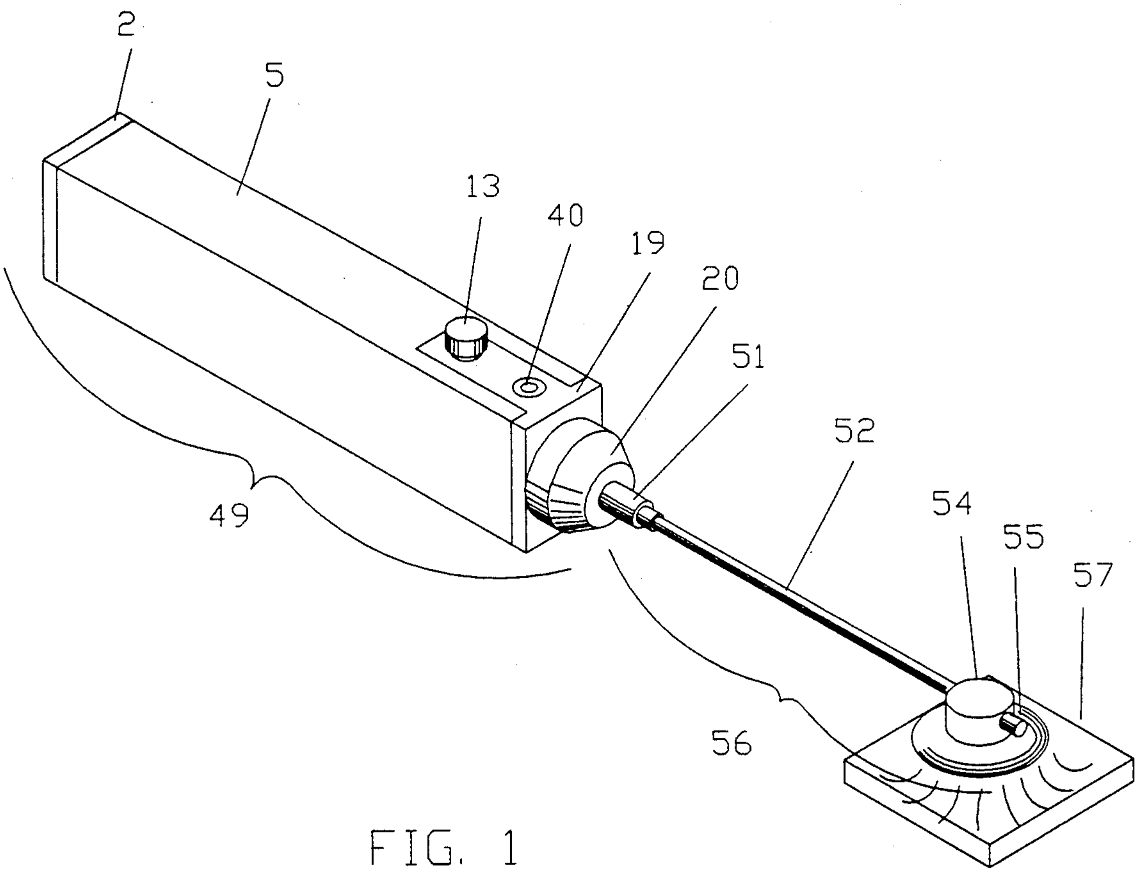
FIG. 1 is an isometric view of the device depicting its use in handling a component.
Figure 3:
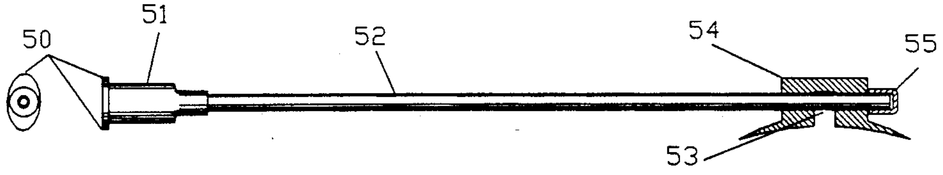
FIG. 3 is a perspective view of the gripping member showing a cross section of the vacuum cup.
Figure 2:
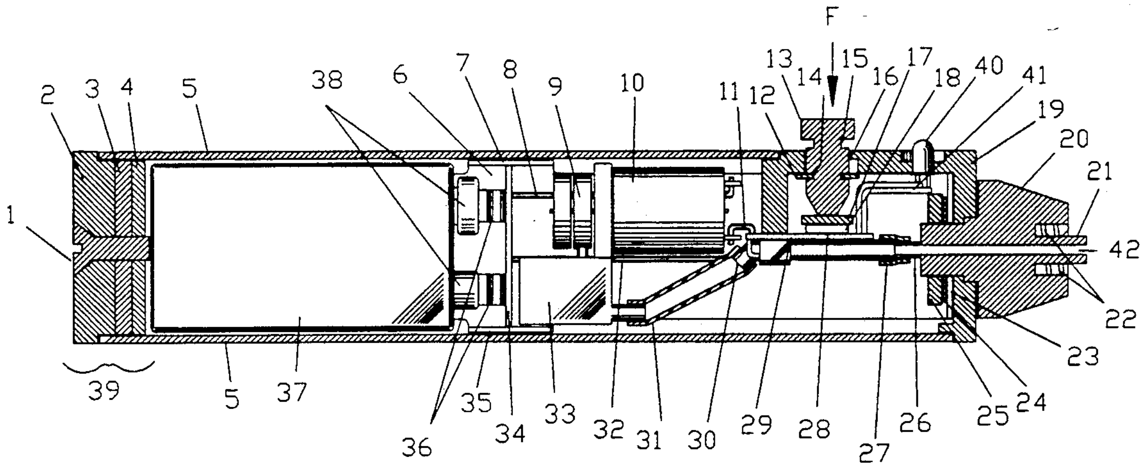
FIG. 2 is a partial cross sectional view of the handling tool showing all of the internal components, the external components and how they fit together.

Referring to FIG. 2 and FIG. 3, this invention comprises extruded hollow tube 5 having a proximal end, a distal end, a control side, and three other sides, the distal end of which may be sealed by a cap assembly 39 comprising a distal end cap 2 through which a screw 1 is threaded into a clamping plate 4. When the screw is turned to draw the clamping plate 4 towards the end cap 2, the rubber pad 3 is compressed and expands outward toward the wall of the extrusion 5 providing a gripping means to hold the cap assembly 39 firmly to the rear of the extruded tube 5. The cap assembly 39 fits snugly against the battery 37 so that contact between the battery posts 38 and the battery contacts 36 is maintained. The battery contacts 36 are permanently attached to the insulator plate 34 which is then fixably attached to the baseplate 6 by upwardly bent flanges 7 and 35. The battery contacts are electrically connected to the pump motor 10 by wire 8 and to the control circuit card 29 by wire 32. The pump motor 10 is mechanically coupled to the air pump 33 by a connecting rod 9. The low pressure side of the air pump 33 is connected to the hollow tube 30 by a length of flexible hose 31 providing an air tight passageway between the pump 33 and the hollow tube 30. The nozzle 20 is rotatably attached to the front escutcheon or proximal end cap 19 using a threaded nut 25 and a crescent spring washer 24. The crescent spring washer 24 provides sufficient angular resistance to rotation of the nozzle so that the nozzle does not self-rotate during operation of the tool, yet enough freedom of rotation so that the user of the tool can rotate the nozzle to any desired angle of rotation. The escutcheon or proximal end cap 19 comprises a top plate and a control plate arranged perpendicular to the top plate, with the top plate covering the proximal end of the hollow tube and the control plate covering a hole formed in the control side of the hollow tube. The proximal end cap 19 is connected to the baseplate 6 by a flange 23 located between the escutcheon 19 and the crescent spring washer 24. The head 20 contains a reduced diameter 26 that extends briefly into the hollow tube 30. A short section of flexible hose 27 is firmly positioned on the end of hollow tube 30 and the reduced diameter 26 to provide an air tight seal between the hollow tube 30 and the reduced diameter 26.

The nozzle 20 contains a male tip 21 of varying diameters that fits snugly into the female fitting 51 of the gripping member 56 as shown in FIG. 3. The nozzle 20 may be conveniently fashioned with knurls or ridges on the external surface of the nozzle 20, to facilitate a user being able to grasp and turn the nozzle 20. Attachment of the gripping member 56 to the nozzle male fitting 21 is accomplished as follows. The female fitting 51 is pressed against the male fitting 21 and at the same time a rotational force is applied to the female fitting 51. The flanges 50 on the female fitting 51 then engage with the screw threads 22 and the female fitting 51 is pulled snugly against the male fitting 22 for an air tight seal. Various configurations of gripping members can used with this invention. A bend of various angles placed along the length of the extension tube 52 would be advantageous for many handling applications. The gripping member 56 consists of a fitting 51 with an internal hollow section of varying diameters, a hollow extension tube 52, a suction cup 54 made of a material that will not contaminate objects that it contacts and will withstand elevated temperatures, and a cap member 55 or other sealing means that provides an air tight seal to the end of the hollow extension tube 52. A hole 53 is formed in the extension tube to allow air to be evacuated from the suction cup cavity during operation of this invention.

Figure 4:
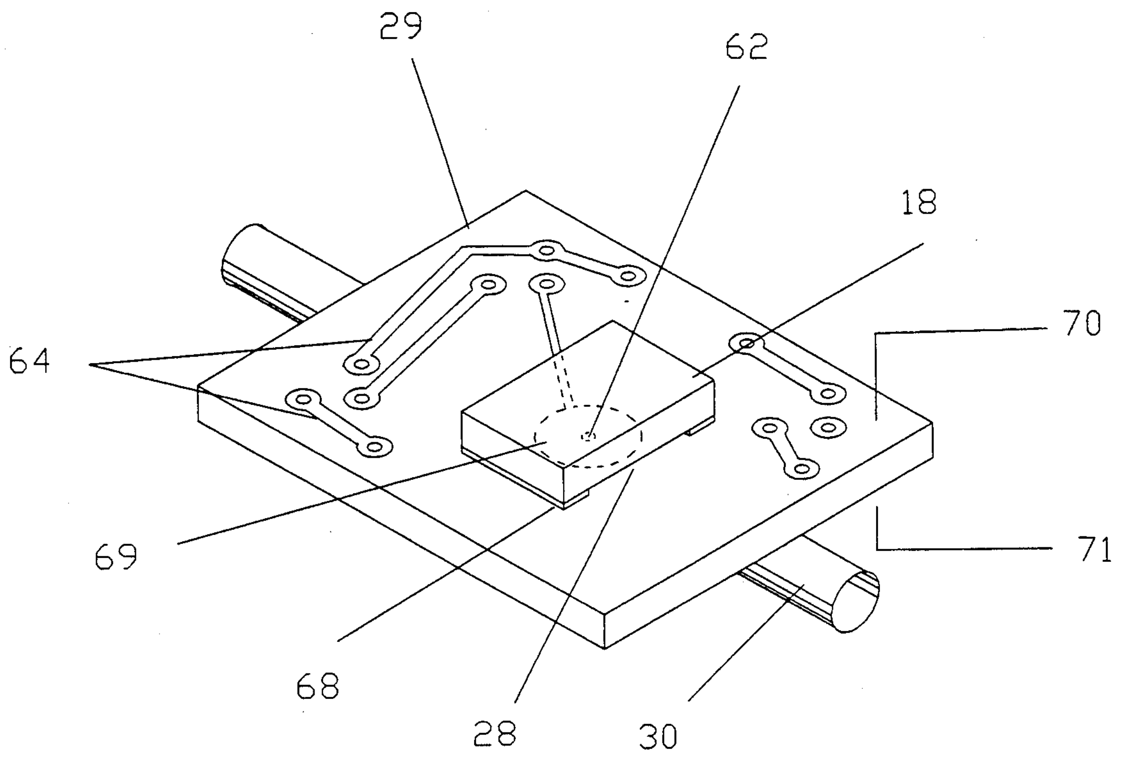
FIG. 4 is an isometric view of the circuit card that shows all of the critical components needed to control the handling tool.

The actuator member 13 enters the proximal end cap 19 through a hole formed in the control plate. A reduced diameter section 14 allows a retaining clip 12 to be engaged therein. The retaining clip 12 prevents the actuator member 13 from falling out of the hole. The operation of the switch is shown in FIG. 4 and the schematic diagram of FIG. 5. The circuit board 29 has two sides, the component side 7; and the circuit side 70. The circuit board 29 supports interconnecting electrical circuitry 64, transistors Q1 and Q2, arranged as a darlington pair and resistor R1 to control electrical current flow the motor 10. The hollow tube 30 is homogeneously bonded to the component side 71 of the circuit card 29. There is a hole 62 formed from the circuit side 70 of the circuit board 29 through the circuit board 29 and penetrating into the adjacent wall of the hollow tube 30. The hole 62 is located in the center of the printed circuit main control pad 69 which is in turn centered beneath the flexible circuit 18. The flexible circuit 18 is bonded to two spacers 68 and the two spacers are in turn bonded to the circuit board 29. This method of attaching the flexible cuircuit 18 creates an electrical insulating air space 28 between the flexible circuit 18 and the main control pad 69.

Figure 5:
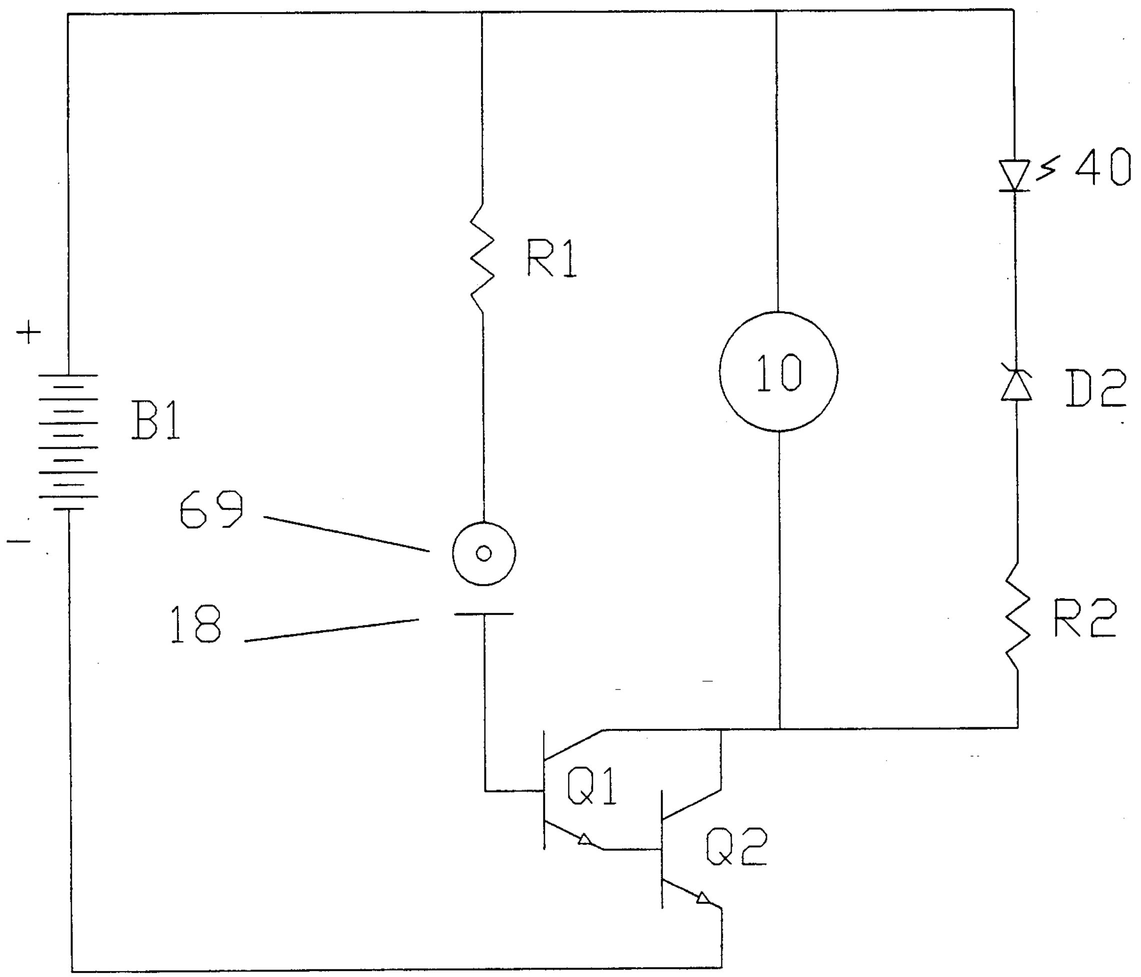
FIG. 5 is a schematic diagram of the circuitry that controls the motor and battery condition indicator.

When a external force F is applied to the actuator member 13, the spring pad 17 constructed of resilient foam or other spring mechanism temporarily deforms into the flexible circuitry 18. The flexible circuitry 18 in turn temporarily deforms and makes physical contact with the main control pad 69 circuitry. The contact of the flexible circuit 18 to the main control pad 69 serves two purposes. First of all, as shown in FIG. 5, an electronic valve is closed so that an electrical circuit is completed and electrical current flows from the negative (−) end of battery B1 into the emitter of Q2, out of the base of Q2, into the emitter of Q1, out of the base of Q1, through the completed circuit of flexible circuitry 18, through the main control pad 69, through the current limiting resistor R1 and into the positive (+) end of battery B1. This current flow turns on Q1 and Q2 which provides a current path out of the negative (−) end of the battery, into the emitter of Q2, out of the collector of Q2, through the motor 10, and back into the positive (+) end of the battery. The motor 10 begins running and in FIG. 2 the connecting means 9 between the motor 10 and the pump 33 actuates the pump. Air is evacuated from passageways formed by the hose 31, tube 30, passageway 42, the hollow section of the gripping means 56, and the suction cup 54. The hole 62, which serves as a pneumatic valve, is now sealed by physical contact of the flexible circuit 18 to main control pad 69. If the suction cup 54 is now placed in contact with an object 57, then a low pressure is created in the passageways and the object is now firmly gripped and the tool can now be used to manipulate the object in the fashion desired.

Referring again to FIG. 2, the on state of Q1 and Q2 also provides a current path out of the negative (−) end of the battery through the emitter/collector circuit of Q2, through current limiting resistor R2, through zener diode D2, through light emitting diode 40 and back into the positive (+) end of the battery B1. Light emitting diode 40 lights up to indicate that the battery level is acceptable for continued use of the tool. The current path just described will only exist when the voltage level of the battery B1 is of a magnitude high enough to cause the zener diode D2 to avalanche and conduct current. When the battery level is below the D2 avalanche voltage plus the light emitting diode 40 operating voltage, then no current flows in this circuit and the light emitting diode 40 is off. This feature of the circuit indicates to the user of the tool when the battery B1 level is acceptable for continued use and when the battery B1 level is so low that the battery B1 should be replaced for continued reliable use of the tool.

In FIG. 2, if the external force F to the actuator member 13 is now increased so that the actuator member 13 moves into the hollow tube 5 so that the reduced diameter section 15 of actuator member 13 is in alignment with escutcheon member 16 and the force on the actuator is vectored towards the light emitting diode 40, then the actuator member will move to engage the escutcheon member 16 into the reduced diameter section 15 of the actuator 13. The external force can now be removed from the actuator member 13 and the tool will remain in the actuated state. Locking the unit to the on state is advantageous when handling fragile objects. Without this feature, the actuating force can accidentially be removed by the slip of a finger which would result in dropping a fragile object. If a force is now applied to the actuator member 13 in a direction that causes the reduced diameter section to disengage from the escutcheon member 16, then the memory of the spring pad 17 and the memory of the flexible circuitry 18 return to the form that existed before any external pressure was applied to the actuator member 13, and the actuator member returns to its original position. The flexible circuitry no longer contacts the main control pad 69. The transistor pair Q1 and Q2 turn off and current is no longer supplied to the motor 10 or the light emitting diode 40 and both turn off.

Synchronous With the release of the flexible circuitry 18 from the main control 69, the seal between the hole 62 and the flexible circuitry is now broken. Air is allowed to enter through the hole 62 and into the passageways formed by the hose 31, tube 30, passageway 42, the hollow section of the gripping means 56, and the suction cup 54. This air flow immediately drops the low pressure contained in the passageways to ambient atmospheric level and the object 57 is instantly released from the suction cup 54. Without this pneumatic valving arrangement integrated with the electrical switch, several seconds of time would elapse before the low pressure level inside of the passageways would bleed to a level low enough to effect release of the object 57.

The invention has been described in detail with particular reference to preferred embodiments thereof. As will be apparent to those skilled in the art in the light of the accompanying disclosure, many alterations, substitutions, modifications, and variations are possible in the practice of this invention without departing from the spirit and scope of the invention.

We claim:

1. A hand held tool for picking up small objects comprising:

(a.) an elongated rectangular hollow tube having a control side and three other sides, a distal end and a proximal end into which a proximal end cap is fitted, said proximal end cap comprising a top plate and a control plate arranged perpendicular to said top plate, said top plate covering said proximal end of said hollow tube and said control plate covering a hole formed in said control side, with each of said plates having at least one hole formed therein, (b.) a nozzle rotatably fitted into said hole formed in said top plate so that said nozzle extends from the exterior to the interior of said hollow tube, (c.) a suction creating means located inside said hollow tube, said suction creating means further comprising an electrically operated air pump, (d.) an actuator member extending from the exterior to the interior of said hollow tube through said hole formed in said control plate, (e.) an electrical battery located inside said hollow tube, (f.) an electric circuit and electronic valve located inside said hollow tube, which electronic valve is closed to complete said circuit by moving said actuator member into said interior of said hollow tube, which circuit activates said electrically operated air pump, and (g.) a valving system and pneumatic valve located inside of said hollow tube, which pneumatic valve is closed by moving said actuator into said interior of said hollow tube, which circuit draws air through said nozzle from the exterior of said hollow tube when said electrically operated air pump is activated.

2. A hand held tool for picking up small objects as described in claim 1, wherein said actuator member further comprises:

(a.) a cylindrical shaped member with an increased diameter section, a first decreased diameter section, and a second decreased diameter section, (b.) wherein said increased diameter section is located on the exterior of said hollow tube, so that said increased diameter section cannot move to the interior of said hollow tube, (c.) a retaining member fitted onto said first decreased diameter section so that said first decreased diameter section cannot move to the exterior of said hollow tube through said hole formed in said control plate, (d.) a locking mechanism fitting onto said second decreased diameter section so that said locking mechanism may be forced against said control plate to cause said actuator member to remain in a position in which said electrical circuit is completed.

3. A hand held tool for picking up small objects as described in claim 1, further comprising:

(a.) a distal cap fit into said distal end of said hollow tube, wherein said cap has outside dimensions equal to the outside dimensions of said rectangular hollow tube and a section of said cap contains reduced dimensions to allow said cap to protrude into said rectangular hollow tube, said cap having a hole formed therein, (b.) a resilient pad with outside dimensions equal to the inside dimensions of said rectangular hollow tube, said pad having a hole formed therethrough, said pad in contact with said end cap section protruding into said rectangular hollow tube, (c.) a clamping member with outside dimensions equal to the inside dimensions of said rectangular hollow tube, said clamping member having an internal screw hole formed therethrough and an internal screw inserted in said internal screw hole, said clamping member in contact with said resilient pad, (d.) a screw fitted through said cap, through said resilient pad, engaging said internal screw of said clamping member, in such a manner that when the screw is tightly engaged, said resilient pad expands thereby gripping the internal surfaces of said rectangular tube, whereby said cap is temporarily attached to said rectangular tube.

4. A hand held tool for picking up small objects as described in claim 1, wherein said electric circuit further comprises:

(a.) a circuit board with a component side and a circuit side containing electronic components and a portion of said valving system homogeneously bonded to the component side of said circuit board, (b.) on said circuit board, a controlling transistor, with a base, collector, and emitter, and an amplifying transistor, configured as a darlington pair with the base of the controlling transistor connected to a circuit pad containing a hole formed through said pad, said circuit card, and into said portion of said valving system, (c.) on said circuit board, a resilient electrically conductive material attached above said circuit pad, not contacting said circuit pad, in a circuit configuration to become a controlling voltage reference required to activate said darlington pair, (d.) such that when a force is applied to said resilient electrically conductive material flexing said resilient electrically conductive material against said circuit pad, said hole becomes sealed preventing air from entering said portion of said valving system through said hole in said pad, and said controlling voltage activates said darlington pair, (e.) such that when said force is removed from said resilient electrically conductive material, air is permitted to enter said portion of said valving system and the darlington pair is deactivated.

5. A hand held tool for picking up small objects as described in claim 4, further comprising:

a circuit with a zener diode that senses battery voltage and controls current through a light emitting diode in the circuit to visually indicate battery condition.

6. A hand held tool for picking up small objects as described in claim 1, wherein said nozzle further comprises:

(a.) an internal section that telescopically connects to said suction creating means and provides an air tight seal, (b.) an external section of a fixed diameter that contains knurls, (c.) a variable diameter male fitting for mating with a female gripping member, said male fitting surrounding by a female screw section that engages flanges on said female gripping member.

7. A hand held tool for picking up small objects as described in claim 6, further comprising:

(a.) an internal section of said nozzle containing a male threaded area, said threaded area engaged with a nut and a crescent washer located between said nut and said internal section of said nozzle, (b.) said crescent washer providing resistance to rotation of said nozzle so that said female gripping member does not cause said nozzle to rotate during handling procedures, (c.) said crescent washer provides freedom of rotation of said nozzle so that said nozzle can be rotated to a position comfortable for a user of the tool.

* * * * *